United States Patent
Wang et al.

(10) Patent No.: US 11,616,873 B2
(45) Date of Patent: Mar. 28, 2023

(54) COMMUNICATION DEVICE AND OUTPUT SIDETONE ADJUSTMENT METHOD THEREOF

(71) Applicant: Airoha Technology Corp., Hsinchu (TW)

(72) Inventors: Cheng-Te Wang, Taipei (TW); Kuo-Wei Kao, Taipei (TW); Jian-Ying Li, Taipei (TW); Kuo-Ping Yang, Taipei (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 23 days.

(21) Appl. No.: 17/189,302

(22) Filed: Mar. 2, 2021

(65) Prior Publication Data

US 2022/0141325 A1 May 5, 2022

(30) Foreign Application Priority Data

Nov. 4, 2020 (CN) .......................... 202011219867.8

(51) Int. Cl.
*H04M 1/58* (2006.01)
(52) U.S. Cl.
CPC .................................... *H04M 1/58* (2013.01)
(58) Field of Classification Search
None
See application file for complete search history.

(56) References Cited

U.S. PATENT DOCUMENTS

| | | | | |
|---|---|---|---|---|
| 6,151,391 | A * | 11/2000 | Sherwood | H04M 1/58 379/391 |
| 6,993,125 | B2 * | 1/2006 | Michaelis | H04M 1/58 379/391 |
| 7,177,419 | B2 * | 2/2007 | Sedarat | H04B 3/23 379/406.13 |
| 7,330,739 | B2 * | 2/2008 | Somayajula | H04M 1/6008 379/388.07 |
| 8,504,115 | B2 * | 8/2013 | Junge | H04M 1/58 379/100.15 |
| 10,115,412 | B2 * | 10/2018 | Von Bulow | H04R 3/04 |
| 2010/0296668 | A1 * | 11/2010 | Lee | G10K 11/1783 381/94.7 |
| 2021/0390972 | A1 * | 12/2021 | Lu | H03G 3/301 |

* cited by examiner

Primary Examiner — Quoc D Tran
(74) Attorney, Agent, or Firm — McClure, Qualey & Rodack, LLP

(57) ABSTRACT

A communication device and an output sidetone adjustment method thereof are disclosed. The method includes the steps of: receiving a far-end sound; receiving a near-end sound to form a sidetone and obtaining an average input volume of the near-end sound; detecting ambient noise of the near-end sound; analyzing an average noise volume and a noise frequency band of the ambient noise to determine whether the average noise volume of the ambient noise is higher than the average input volume; if yes, adjusting the volume of the sidetone in a specific frequency band by increasing it by a first gain value to form an adjusted sidetone, wherein the specific frequency band and the noise frequency band of the ambient noise belong to the same frequency band or different frequency bands; and outputting the adjusted sidetone and the far-end sound.

22 Claims, 10 Drawing Sheets

COMMUNICATION DEVICE AND OUTPUT SIDETONE ADJUSTMENT METHOD THEREOF

BACKGROUND OF THE INVENTION

1. Field of the Invention

The present invention relates to a communication device and an output sidetone adjustment method thereof, and more particularly, to a communication device and an output sidetone adjustment method thereof capable of making adjustments according to the frequency range of external noise.

2. Description of the Related Art

When a user talks on the phone in a noisy environment, the user often talks louder and louder because the user cannot clearly hear the user's own voice. Generally, the term "sidetone" refers to the user's speaking voice picked up by a microphone of a communication device and played back into a speaker of the communication device, which compensates for the deficiency of the user's speaking voice the user hears. The user determines whether the user has to adjust the loudness of the user's speaking voice according to the volume of the user's speaking voice which the user hears. Thus, when the user talks on the phone, the user will talk more naturally in conversation if the communication device can provide a sidetone at an appropriate volume, especially in a noisy environment. Therefore, the user will not talk louder and louder and make the noisy environment even noisier. In addition, many conventional microphones of communication devices have a noise-canceling ability. Consequently, the person on the other end can clearly hear what is being said even if the user (the speaking person) does not raise the user's voice in a noisy environment. Therefore, if the communication device can provide a sidetone whose volume is properly adjusted, the person on the other end will not receive a signal at too high a volume.

Both U.S. patent publication No. 20050177365A1 and U.S. Pat. No. 6,801,623B1 disclose a technique for adjusting a sidetone volume according to the volume of signals picked up by a microphone or the volume of background noise. However, if the sidetone volume is adjusted only based on the volume of signals picked up by a microphone or the volume of background noise, the devices or systems will have to provide a user with very loud sidetone in a quite noisy environment and may not allow the user to clearly hear the sidetone in the noisy environment.

Therefore, it is desirable to provide an improved communication device and an output sidetone adjustment method thereof to mitigate and/or obviate the aforementioned problems.

SUMMARY OF THE INVENTION

It is a main object of the present invention to provide a communication device capable of adjusting a sidetone according to the frequency range of external noise.

It is another main object of the present invention to provide an output sidetone adjustment method used in the aforementioned communication device.

In order to achieve the above-mentioned objects, the communication device of the present invention comprises a sound processor, a far-end sound receiver, a near-end sound receiver, a noise detector, a noise analyzer, and a sound player. The far-end sound receiver is electrically connected to the sound processor used for receiving a far-end sound. The near-end sound receiver is electrically connected to the sound processor and used for receiving a near-end sound to allow the sound processor to receive the near-end sound to form a sidetone and to obtain an average input volume of the near-end sound. The noise detector is electrically connected to the sound processor and used for detecting ambient noise of the near-end sound. The noise analyzer is electrically connected to the noise detector and used for analyzing an average noise volume and a noise frequency band of the ambient noise to determine whether the average noise volume of the ambient noise is higher than the average input volume. If the average noise volume of the noise frequency band is higher than the average input volume, the sound processor adjusts the volume of the sidetone in a specific frequency band by increasing it by a first gain value to form an adjusted sidetone, wherein the specific frequency band and the noise frequency band of the ambient noise belong to the same frequency band or different frequency bands. The sound player is electrically connected to the sound processor and used for outputting the adjusted sidetone and the far-end sound.

The output sidetone adjustment method of the present invention comprises the following steps: receiving a far-end sound wirelessly or over wires; receiving a near-end sound to form a sidetone and obtaining an average input volume of the near-end sound; detecting ambient noise of the near-end sound; analyzing an average noise volume and a noise frequency band of the ambient noise to determine whether the average noise volume of the ambient noise is higher than the average input volume; if the average noise volume is higher than the average input volume, adjusting the volume of the sidetone in a specific frequency band by increasing it by a first gain value to form an adjusted sidetone, wherein the specific frequency band and the noise frequency band of the ambient noise belong to the same frequency band or different frequency bands; and outputting the adjusted sidetone and the far-end sound.

DETAILED DESCRIPTION OF THE PREFERRED EMBODIMENTS

The advantages and innovative features of the invention will become more apparent from the following detailed description when taken in conjunction with the accompanying drawings.

Figure 1A:
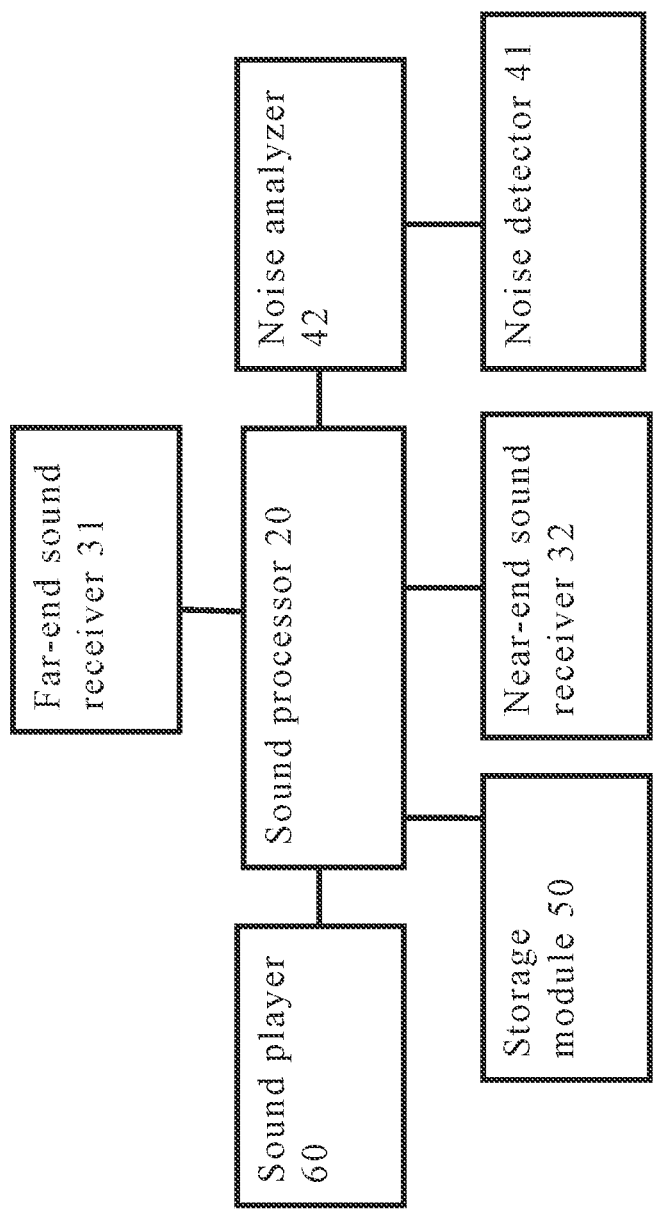
FIG. 1A is a schematic drawing of the structure of a communication device of the present invention.

For the following description, please refer to FIG. 1A. FIG. 1A is a schematic drawing of the structure of a communication device of the present invention.

Figure 1B:
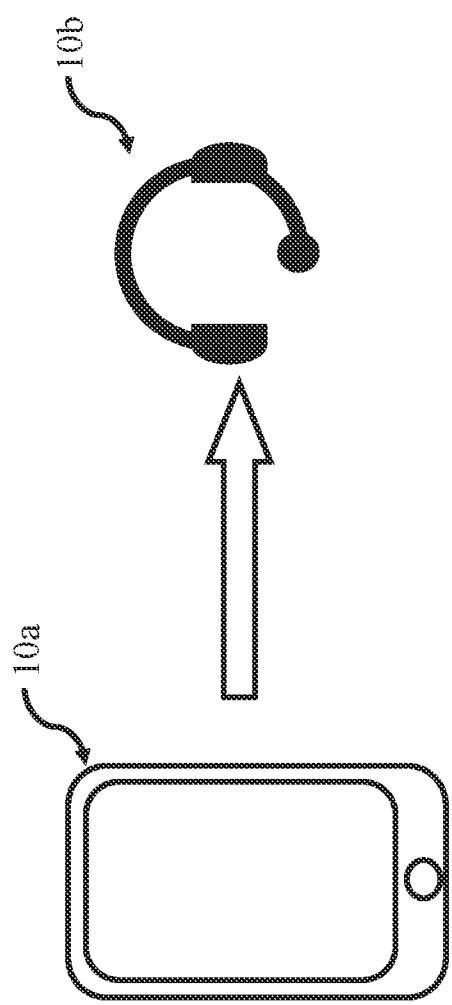
FIG. 1B is a schematic drawing of a different embodiment of a communication device of the present invention.

In one embodiment of the present invention, a communication device 10 can be a smartphone or a smart wearable device (e.g., earphones). The communication device 10 of the present invention comprises a sound processor 20, a far-end sound receiver 31, a near-end sound receiver 32, a noise detector 41, a noise analyzer 42, and a sound player 60. The sound processor 20 may be configured as a hardware device, a combination of a software program and a hardware device, a combination of firmware and a hardware device, etc. for processing all audio signals received by the communication device 10. In one embodiment of the present invention, the sound processor 20 can be an equalizer (EQ) used for adjusting the gain value of an audio signal in each frequency band. The equalizer is a tool for adjusting audio output and can change the gain value of sound in each frequency band. Thus, it is commonly used to adjust sound output. The far-end sound receiver 31 is electrically connected to the sound processor 20 and used for receiving a far-end sound. Moreover, the far-end sound receiver 31 transmits the far-end sound to the sound processor 20 to allow the sound processor 20 to adjust the far-end sound. In one embodiment of the present invention, the communication device 10 can be a smartphone 10a (as shown in FIG. 1B). The far-end sound is the speaking voice of the person on the other end of the communication device 10. Thus, the far-end sound receiver 31 is a wireless signal receiving module capable of receiving GSM, 2G, or 3G signals or wireless signals such as WIFI signals or Bluetooth signals. GSM, 2G, and 3G are mobile communication standards. The present invention is not limited to the types of signals received or transmitted by the far-end sound receiver 31. Please refer to FIG. 1B as well. FIG. 1B is a schematic drawing of a different embodiment of a communication device of the present invention. In one embodiment of the present invention, the communication device 10 can also be earphones 10b connected to a smartphone 10a. The smartphone 10a receives an audio signal via a cellular network and then transmits the audio signal to the earphones 10b wirelessly or over wires. Thus, the far-end sound here is the sound transmitted from the smartphone 10a wirelessly or over wires.

The near-end sound receiver 32 is electrically connected to the sound processor 20. Moreover, the near-end sound receiver 32 can be a microphone used for receiving a near-end sound. The near-end sound is the sound which a user wants the near-end sound receiver 32 to receive when the user is talking on the phone. The near-end sound receiver 32 transmits the near-end sound to the sound processor 20 after receiving the near-end sound so that the near-end sound is processed to form a sidetone. A sidetone is audio feedback to someone speaking and originates from the user's own voice. Thus, the volume of the sidetone relates to the volume of the user's speaking voice. The sound processor 20 simultaneously calculates an average input volume of the near-end sound as well. The average input volume can be an overall average volume of the near-end sound or the average input volume in each frequency band of the near-end sound. The frequency band of the near-end sound corresponds to the frequency band of ambient noise, which is described below.

The noise detector 41 is electrically connected to the sound processor 20 and used for detecting ambient noise of the near-end sound. In another embodiment, the noise detector 41 can also be integrated into the near-end sound receiver 32. For example, when the volume in a certain frequency band of the received near-end sound increases significantly, sound in this frequency band is defined as the near-end sound for calculating the sidetone. Then sound in the other frequency bands is defined as ambient noise for calculating an average noise volume. The noise analyzer 42 is electrically connected to the noise detector 41. Moreover, the noise analyzer 42 is used for analyzing the average noise volume of the ambient noise obtained by the noise detector 41 and for obtaining a noise frequency band of the ambient noise. Take FIG. 3 for example: There are frequency bands of 32 Hz, 64 Hz, 125 Hz, 250 Hz, 500 Hz, 1000 Hz, 2000 Hz, 4000 Hz, 8000 Hz, and 16000 Hz. The noise detector 41 can obtain which frequency band the ambient noise belongs to. However, in some cases, the ambient noise can also be distributed over a plurality of frequency bands simultaneously. However, it is noted that the aforementioned frequency bands are provided merely as an example. The present invention is not limited to the aforementioned frequency bands. The noise analyzer 42 can determine whether the average noise volume of the ambient noise is higher than the average input volume. There are two options for the determination. In the first option, the noise analyzer 42 determines whether the average noise volumes in all frequency bands of the ambient noise are higher than the average input volumes in all frequency bands of the near-end sound. In the second option, the noise analyzer 42 determines whether the average noise volume in the noise frequency band of the ambient noise is higher than the average input volume in a corresponding frequency band of the near-end sound. For example, when the noise frequency band is 500 Hz, the corresponding frequency band of the near-end sound is 500 Hz. Thus, the noise analyzer 42 can determine the amount of the average input volume of the near-end sound and that of the ambient noise in the same frequency band. If the average noise volume of the ambient noise is higher than the average input volume, the noise analyzer 42 can further determine whether the volume difference between the average noise volume and the average input volume exceeds a threshold. For example, when the average input volume of the input audio signal is 60 dB, if the average noise volume of the ambient noise exceeds the average input volume by 20 dB, then the noise analyzer 42 confirms that the average noise volume of the ambient noise exceeds the threshold. However, the present invention is not limited to the setting value of the threshold.

When the noise analyzer 42 determines that the average noise volume of the ambient noise is higher than the average input volume, the sound processor 20 can adjust the volume of the sidetone in a specific frequency band by increasing it by a first gain value to form an adjusted sidetone signal according to the volume characteristic of the ambient noise. The specific frequency band here and the noise frequency band of the ambient noise belong to the same frequency band or different frequency bands. The sound processor 20 can also simultaneously adjust the volumes of the sidetone which do not belong to the specific frequency band. When the volume difference between the average noise volume and the average input volume exceeds the threshold, the sound processor 20 can increase volumes of the sidetone which do not belong to the specific frequency band by a second gain value. When the volume difference between the average noise volume and the average input volume does not exceed the threshold, the sound processor 20 can decrease volumes of the sidetone which do not belong to the specific frequency band by a second gain value. Moreover, the second gain value is smaller than the first gain value. In other words, the sound processor 20 does not make the same adjustment to the volumes of the sidetone in all specific frequency bands. There are many options for the adjustment. In the first option, the sound processor 20 only adjusts the sidetone in a frequency band the same as the noise frequency band. In the second option, the sound processor 20 only adjusts the input audio signal in the frequency bands different from the noise frequency band. In the third option, the sound processor 20 adjusts the sidetone in all frequency bands, but the amount of the adjustment to the volume in the specific frequency band is different from that of the adjustment to the volumes not in the specific frequency band. However, please note that the scope of the present invention is not limited by the above description. The amount of the adjustment changes according to the noise frequency band of the ambient noise. The present invention is not limited to adjusting only two gain values. The sound processor 20 can also simultaneously adjust three or more than three gain values.

The communication device 10 of the present invention can further comprise a storage module 50. The storage module 50 is used for storing a user parameter. The user here is the owner of the communication device 10. First, the communication device 10 can allow the user to use the near-end sound receiver 32 to receive the near-end sound which the user makes. Next, the sound processor 20 analyzes the characteristics of the near-end sound to obtain the characteristics of the user's speaking voice such as timbre and tone. For example, the loudness of the user's speaking voice in each frequency band is obtained and set as the user parameter. Then the user parameter is stored in the storage module 50. In addition, the user can set the user parameter based on the user's preference of the volume setting of sound in each frequency band. The present invention is not limited to how the user parameter is set. Therefore, when the processing module 20 adjusts the sidetone according to the results analyzed by the noise analyzer 42, the sidetone can be adjusted also according to the user parameter, such that the adjusted sidetone can emphasize and keep the user's original timbre. This makes sidetone compensation clearer and more obvious.

Last, the sound player 60 is electrically connected to the sound processor 20 and used for playing the adjusted sidetone signal and the far-end sound. The sound player 60 can be earphones or a speaker. However, please note that the scope of the present invention is not limited by the above description. Thus, when the user is using the communication device 10 to place a call, the sound player 60 can play the adjusted sidetone signal without disturbance by external noise.

It is noted that the modules of the communication device 10 may individually be configured as a hardware device, a combination of a software program and a hardware device, a combination of firmware and a hardware device, etc. For example, a computer program product can be stored on a computer-readable medium to perform the functions of the present invention. However, please note that the scope of the present invention is not limited by the above description. In addition, the embodiment described is a preferred embodiment of the present invention provided for reference. To avoid redundancy, not all possible combinations are described in detail. However, those skilled in the art may understand that not all the aforementioned modules or units are necessary. Other detailed modules or units of the prior art may be included in order to execute the present invention. Any of the modules or units can be omitted or modified depending on user requirements, and other modules or units may or may not exist between any two modules.

Figure 2A:
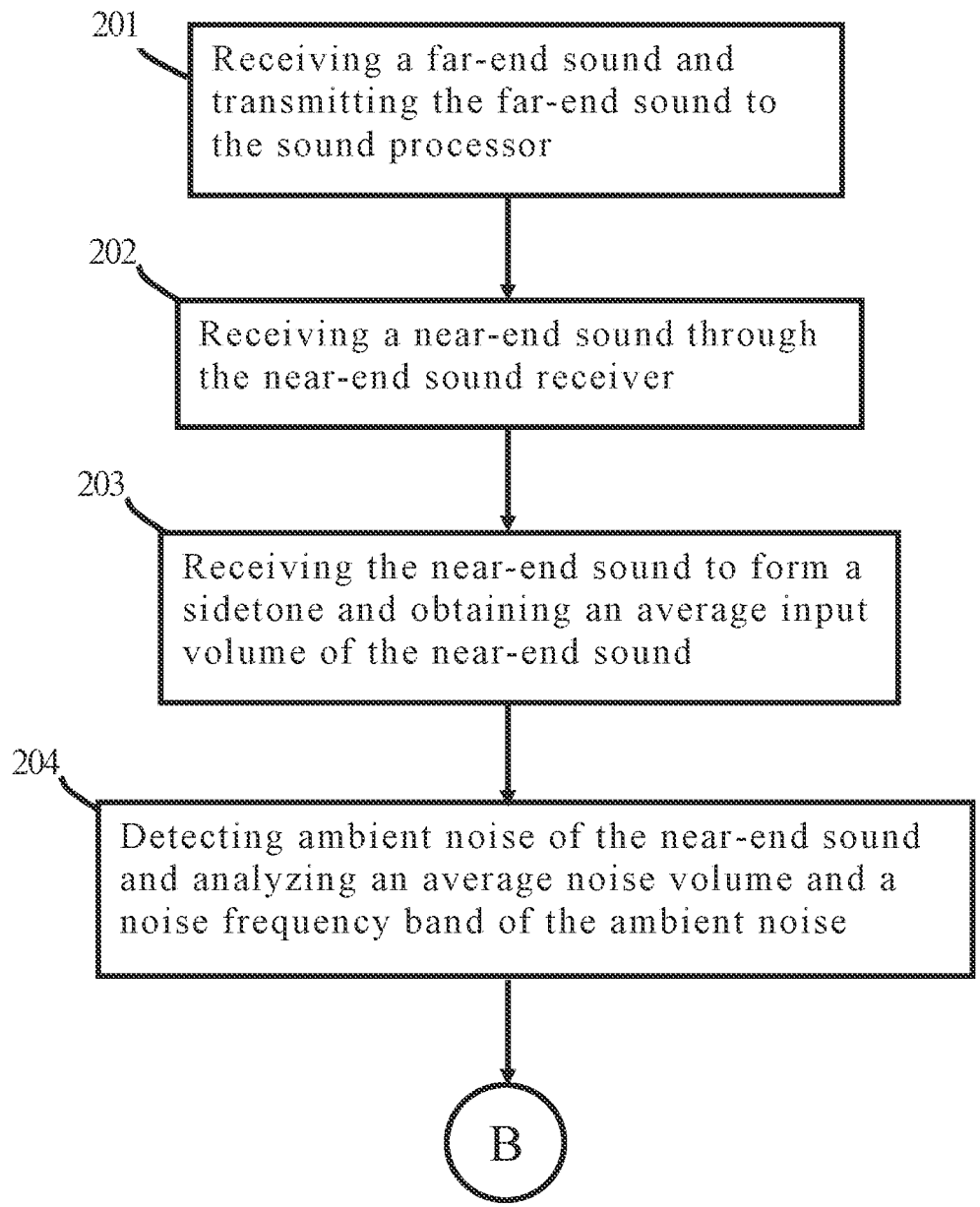
FIGS. 2A-2B are flowcharts showing the steps of an output sidetone adjustment method of the present invention.
Figure 2B:
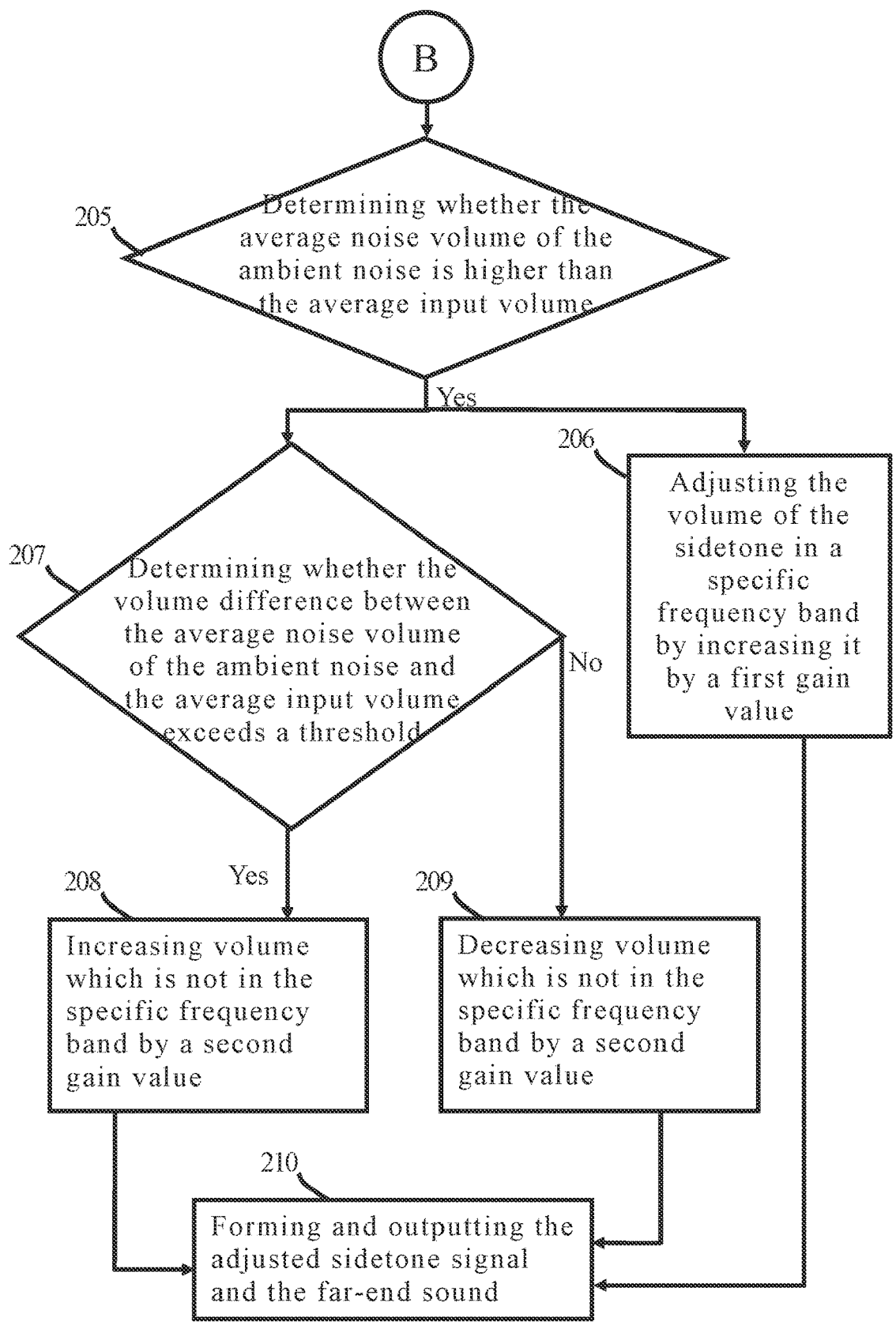

Next, please refer to FIGS. 2A-2B, which are flowcharts showing the steps of an output sidetone adjustment method of the present invention. Please note that the output sidetone adjustment method of the present invention is described in the following paragraphs with the example of the aforementioned communication device 10; however, the output sidetone adjustment method of the present invention is not limited to the use of the aforementioned communication device 10 or a device having an equivalent structure.

The communication device 10 performs step 201: receiving a far-end sound and transmitting the far-end sound to the sound processor.

The far-end sound receiver 31 receives a far-end sound produced by a person on the other end through a communication path and transmits the far-end sound to the sound processor 20.

The present invention performs step 202: receiving a near-end sound through the near-end sound receiver.

The near-end sound receiver 32 receives a near-end sound produced by the user. Please note that steps 201 and 202 can be performed in reverse order. In other words, step 202 can also be performed prior to step 201.

Next, the present invention performs step 203: receiving the near-end sound to form a sidetone and obtaining an average input volume of the near-end sound.

After the near-end sound receiver 32 receives the near-end sound, it is transmitted to the sound processor 20. The sound processor 20 processes the near-end sound to form a sidetone. Moreover, the sound processor 20 can obtain an average input volume of the near-end sound. The average input volume can be an overall average volume of the near-end sound or the average input volume in each frequency band of the near-end sound.

Next, the present invention performs step 204: detecting ambient noise of the near-end sound and analyzing an average noise volume and a noise frequency band of the ambient noise.

The noise detector 41 detects ambient noise outside the communication device 10 according to the received near-end sound. The noise analyzer 42 analyzes an average noise volume of the ambient noise obtained by the noise detector 41 and obtains a noise frequency band of the ambient noise. Take FIG. 3 for example: There are frequency bands of 32 Hz, 64 Hz, 125 Hz, 250 Hz, 500 Hz, 1000 Hz, 2000 Hz, 4000 Hz, 8000 Hz, and 16000 Hz. The noise analyzer 42 can determine which frequency band the noise frequency band belongs to. However, the present invention is not limited to the aforementioned frequency bands or the manner in which frequencies are divided.

In another embodiment, the noise detector 41 can also be integrated into the near-end sound receiver 32. For example, when the volume in a certain frequency band of the received near-end sound increases significantly, sound in this frequency band is defined as the near-end sound for calculating sidetone. Then sound in the other frequency bands is defined as ambient noise. Thus, the noise analyzer 42 can also determine the noise frequency band of the ambient noise.

Next, the noise analyzer 42 performs step 205: determining whether the average noise volume of the ambient noise is higher than the average input volume.

Next, the noise analyzer 42 then determines whether the average noise volume of the ambient noise is higher than the average input volume. The noise analyzer 42 determines whether the average noise volume in all frequency bands of the ambient noise are higher than the average input volume in all frequency bands of the near-end sound or determines whether the average noise volume in the noise frequency band of the ambient noise is higher than the average input volume in a corresponding frequency band of the near-end sound.

If there is one average noise volume in any frequency band of the ambient noise which is higher than the average input volume, the sound processor 20 will perform step 206: adjusting the volume of the sidetone in a specific frequency band by increasing it by a first gain value.

Figure 3:
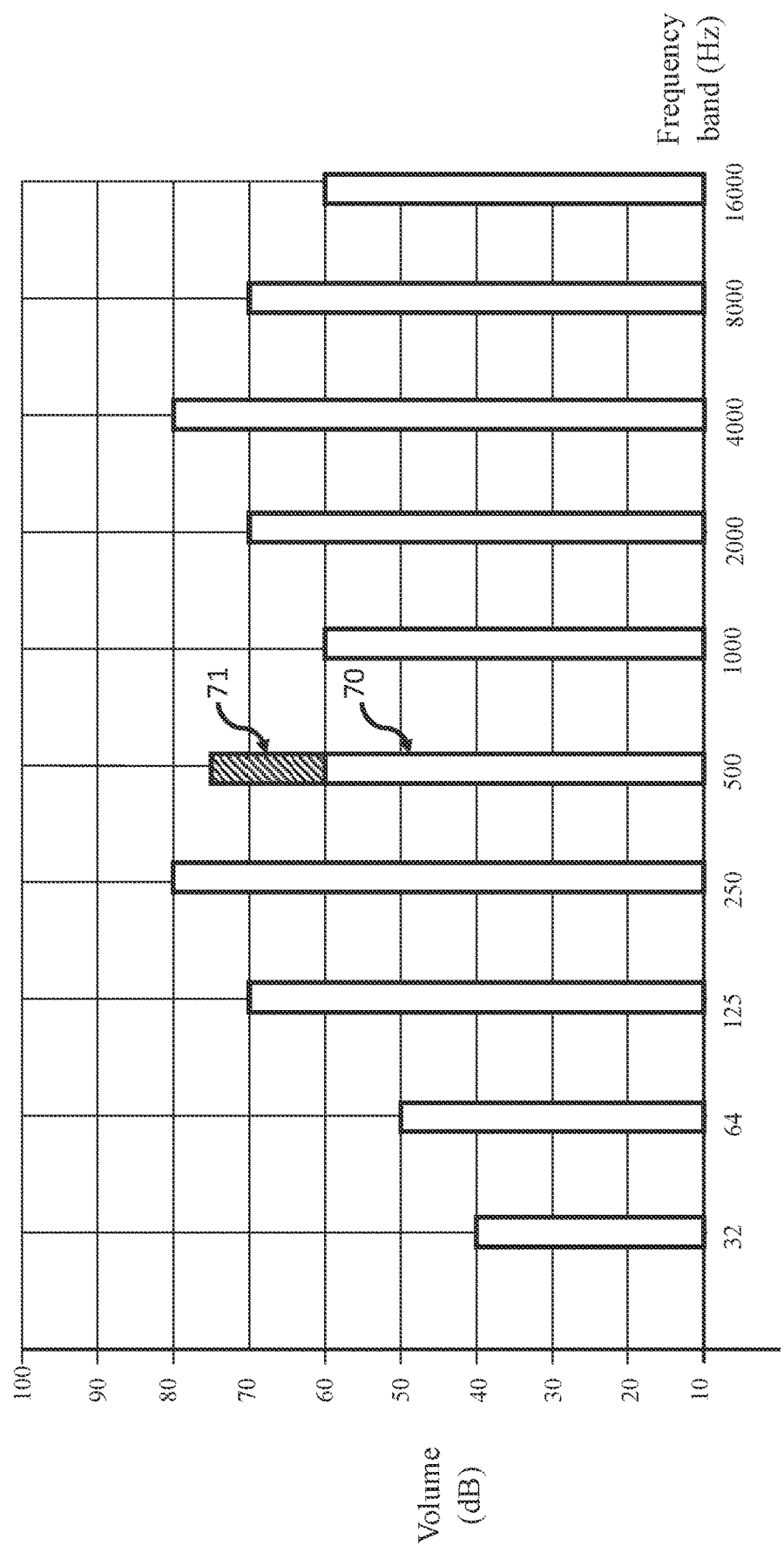
FIG. 3 is a schematic drawing of a frequency spectrum of the adjustment of output sound in different frequency bands of a first embodiment of the present invention.

The sound processor 20 can adjust the volume of the sidetone in a specific frequency band by increasing it by a first gain value to form an adjusted sidetone signal. The specific frequency band here and the noise frequency band of the ambient noise belong to the same frequency band or different frequency bands. Please refer to FIG. 3. FIG. 3 is a schematic drawing of a frequency spectrum of the adjustment of output sound in different frequency bands of a first embodiment of the present invention.

In the first embodiment of the present invention, the specific frequency band and the noise frequency band of the ambient noise belong to the same frequency band. Therefore, after the noise analyzer 42 confirms that 500 Hz is the noise frequency band, the sound processor 20 increases an original gain value 70 of the sidetone belonging to the frequency band of 500 Hz by a first gain value 71. The first gain value 71 can be 15 dB or higher than 15 dB; however, the present invention is not limited thereto. Therefore, the adjusted sidetone signal in the frequency band of 500 Hz is equal to the original gain value 70 plus the first gain value 71.

In addition, after step 206, the present invention can simultaneously perform step 207: determining whether the volume difference between the average noise volume of the ambient noise and the average input volume exceeds a threshold.

The noise analyzer 42 can further determine whether the volume difference between the average noise volume and the average input volume exceeds a threshold.

If the volume difference between the average noise volume and the average input volume exceeds a threshold, the present invention performs step 208: increasing volume which is not in the specific frequency band by a second gain value.

Figure 4:
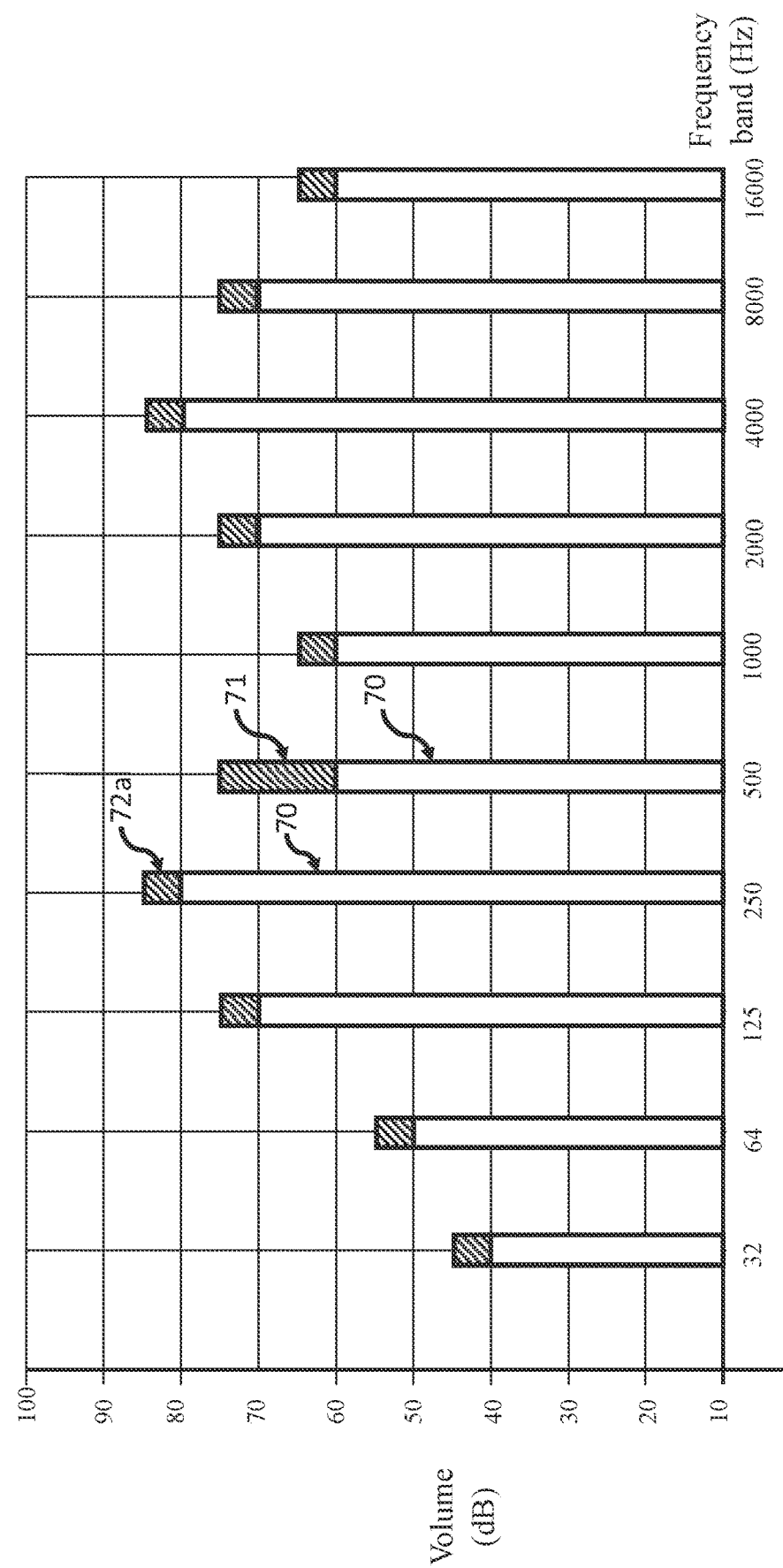
FIG. 4 is a schematic drawing of a frequency spectrum of the adjustment of output sound in different frequency bands of a second embodiment of the present invention.

When the volume difference between the average noise volume and the average input volume exceeds the threshold, the sound processor 20 can simultaneously increase volume of the sidetone which do not belong to the specific frequency band by a second gain value. Please refer to FIG. 4. FIG. 4 is a schematic drawing of a frequency spectrum of the adjustment of output sound in different frequency bands of a second embodiment of the present invention.

In the second embodiment of the present invention, the sound processor 20 increases the original gain value 70 of the sidetone belonging to the frequency band of 500 Hz by the first gain value 71. Moreover, it also increases the original gain value 70 of the sidetone in other frequency bands by a second gain value 72*a*. The second gain value 72*a* is smaller than the first gain value 71. For example, the second gain value 72*a* can be 0-5 dB. However, please note that the scope of the present invention is not limited by the above description. Therefore, the adjusted sidetone signal not in the frequency band of 500 Hz is equal to the original gain value 70 plus the second gain value 72*a*.

If the volume difference between the average noise volume and the average input volume does not exceed a threshold, the present invention performs step 209: Decreasing volume which is not in the specific frequency band by a second gain value.

Figure 5:
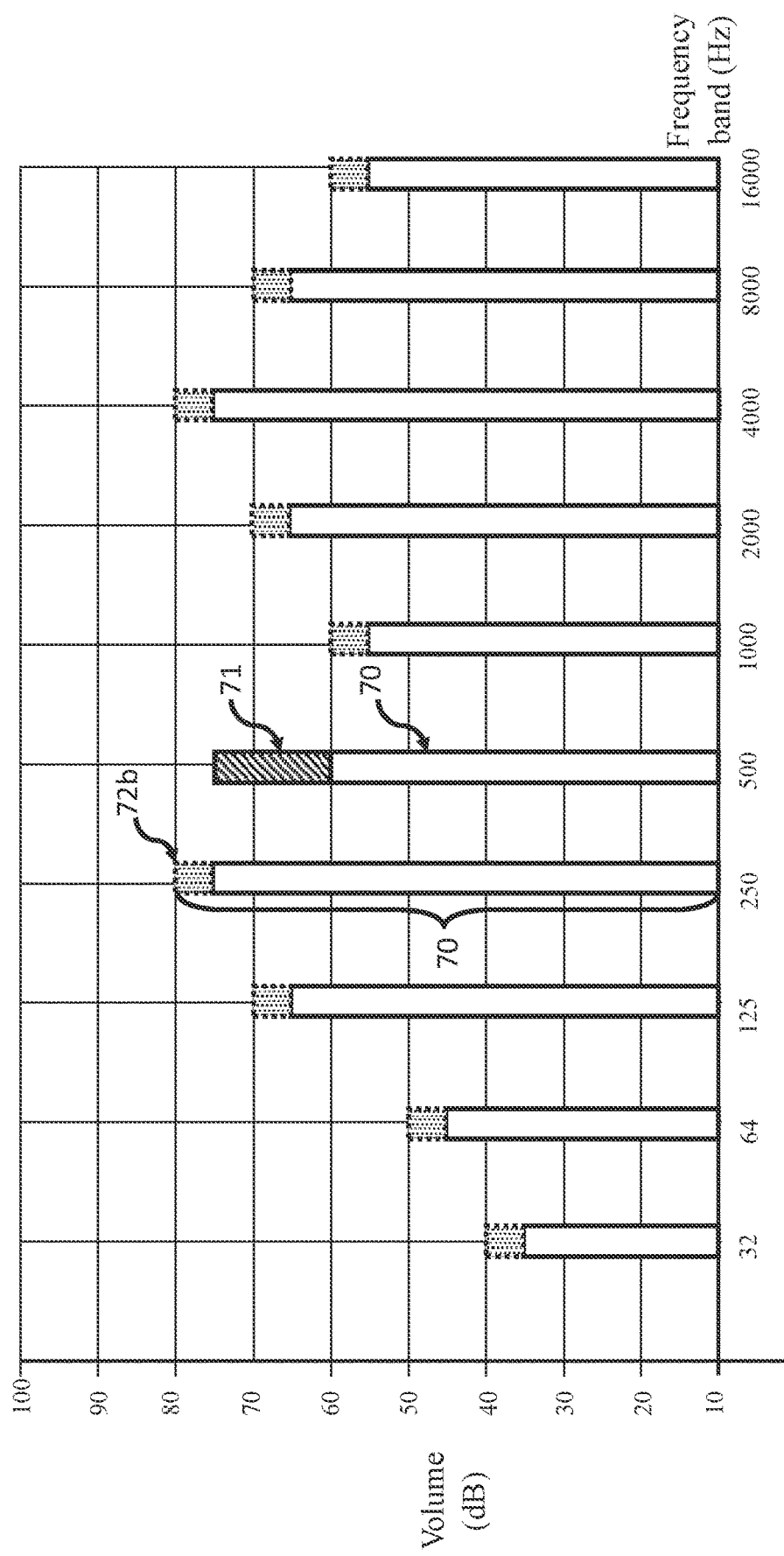
FIG. 5 is a schematic drawing of a frequency spectrum of the adjustment of output sound in different frequency bands of a third embodiment of the present invention.

When the volume difference between the average noise volume and the average input volume does not exceed the threshold, the sound processor 20 can decrease volume of the sidetone which do not belong to the specific frequency band by a second gain value 72*b*. Next, please refer to FIG. 5. FIG. 5 is a schematic drawing of a frequency spectrum of the adjustment of output sound in different frequency bands of a third embodiment of the present invention.

In the third embodiment of the present invention, the sound processor 20 increases the original gain value 70 of the sidetone belonging to the frequency band of 500 Hz by the first gain value 71. Moreover, it also decreases the original gain value 70 of the sidetone in other frequency bands by the second gain value 72*b*. Similarly, the second gain value 72*b* is smaller than the first gain value 71. For example, the second gain value 72*b* can be 0-5 dB. However, please note that the scope of the present invention is not limited by the above description. Therefore, the adjusted sidetone signal not in the frequency band of 500 Hz is equal to the original gain value 70 minus the second gain value 72*b*.

Figure 6:
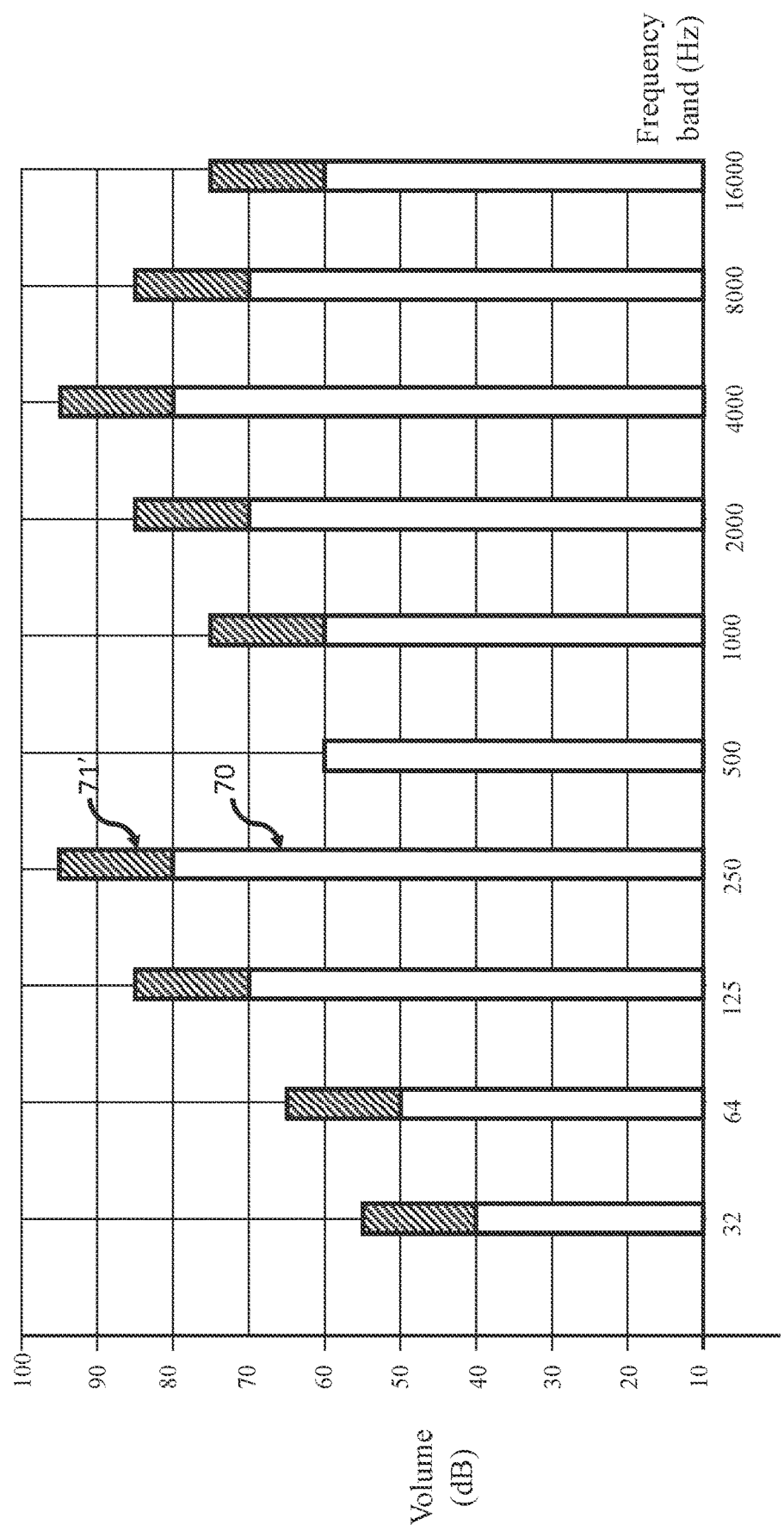
FIG. 6 is a schematic drawing of a frequency spectrum of the adjustment of output sound in different frequency bands of a fourth embodiment of the present invention.

Next, please refer to FIG. 6. FIG. 6 is a schematic drawing of a frequency spectrum of the adjustment of output sound in different frequency bands of a fourth embodiment of the present invention.

In the fourth embodiment of the present invention, the specific frequency band and the noise frequency band of the ambient noise belong to different frequency bands. Therefore, after the noise analyzer 42 confirms that 500 Hz is the noise frequency band, the sound processor 20 increases the original gain values 70 of the sidetone which do not belong to the frequency band of 500 Hz by a first gain value 71'. Similarly, the first gain value 71' can be 15 dB or higher than 15 dB; however, the present invention is not limited thereto. Therefore, the adjusted sidetone signal not in the frequency band of 500 Hz is equal to the original gain value 70 plus the first gain value 71'.

Figure 7:
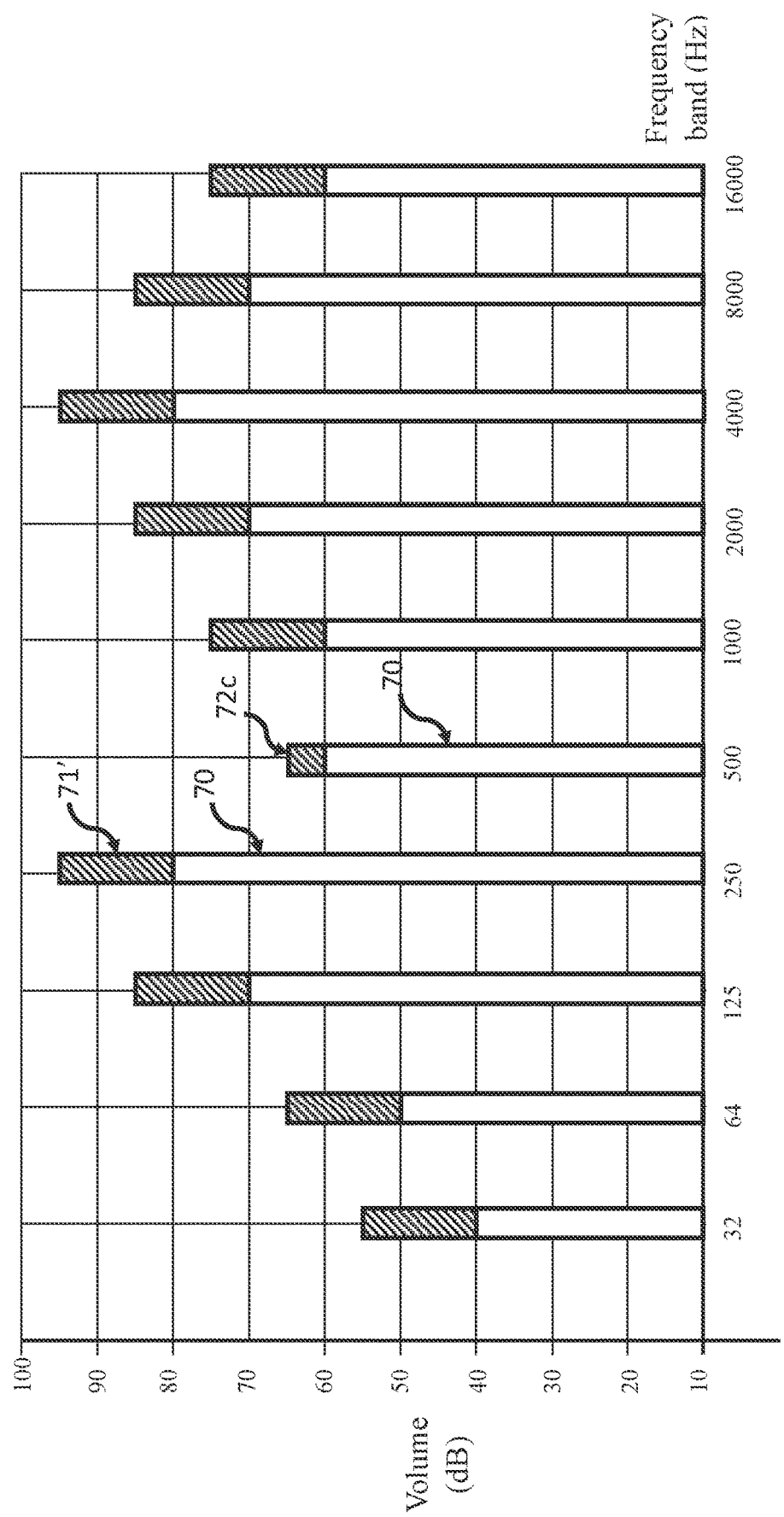
FIG. 7 is a schematic drawing of a frequency spectrum of the adjustment of output sound in different frequency bands of a fifth embodiment of the present invention.

Next, please refer to FIG. 7. FIG. 7 is a schematic drawing of a frequency spectrum of the adjustment of output sound in different frequency bands of a fifth embodiment of the present invention.

The fifth embodiment of the present invention corresponds to step 208 when the volume difference between the average noise volume and the average input volume exceeds the threshold. In the fifth embodiment, the sound processor 20 increases the original gain values 70 of the input audio signal which do not belong to the frequency band of 500 Hz by the first gain value 71'. Moreover, it also increases the original gain value 70 of the input audio signal belonging to the frequency band of 500 Hz by a second gain value 72*c*. Similarly, the second gain value 72*c* is smaller than the first gain value 71'. For example, the second gain value 72*c* can be 0-5 dB. However, please note that the scope of the present invention is not limited by the above description. Therefore, the adjusted sidetone signal in the frequency band of 500 Hz is equal to the original gain value 70 plus the second gain value 72*c*.

Figure 8:
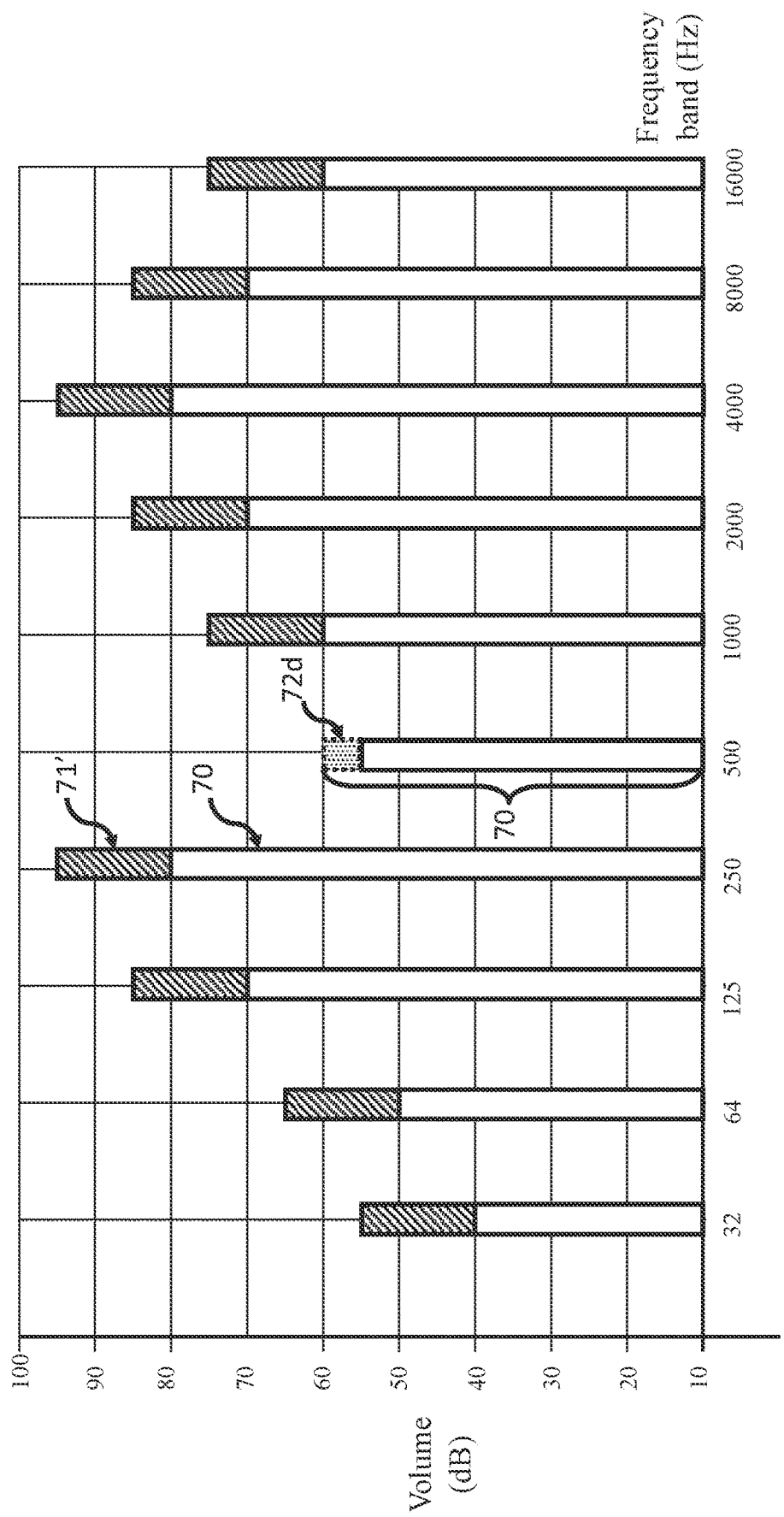
FIG. 8 is a schematic drawing of a frequency spectrum of the adjustment of output sound in different frequency bands of a sixth embodiment of the present invention.

Last, please refer to FIG. 8. FIG. 8 is a schematic drawing of a frequency spectrum of the adjustment of output sound in different frequency bands of a sixth embodiment of the present invention.

Last, the sixth embodiment of the present invention corresponds to step 209 when the volume difference between the average noise volume and the average input volume does not exceed the threshold. In the sixth embodiment, the sound processor 20 increases the original gain values 70 of the sidetone which do not belong to the frequency band of 500 Hz by the first gain value 71'. Moreover, it also decreases the original gain value 70 of the sidetone belonging to the frequency band of 500 Hz by a second gain value 72d. Similarly, the second gain value 72d is smaller than the first gain value 71'. For example, the second gain value 72d can be 0-5 dB. However, please note that the scope of the present invention is not limited by the above description. Therefore, the adjusted sidetone signal in the frequency band of 500 Hz is equal to the original gain value 70 minus the second gain value 72d.

Last, the present invention performs step 210: forming and outputting the adjusted sidetone signal and the far-end sound.

After the above processing in step 206, step 208, or step 209, the sound processor 20 can adjust the sidetone to form the adjusted sidetone signal. Thus, the adjusted sidetone signal can be formed in the manners of adjustment described in the first embodiment to the sixth embodiment. In the first embodiment, the volume of the sidetone in a frequency band the same as the noise frequency band is increased by the first gain value 71. In the second embodiment, the volume of the sidetone in a frequency band the same as the noise frequency band is increased by the first gain value 71. Moreover, the volumes of the sidetone in the frequency bands different from the noise frequency band are increased by the second gain value 72a. In the third embodiment, the volume of the sidetone in a frequency band the same as the noise frequency band is increased by the first gain value 71. Moreover, the volume of the sidetone in the frequency bands different from the noise frequency band are decreased by the second gain value 72b. In the fourth embodiment, the volume of the sidetone in the frequency bands different from the noise frequency band are increased by the first gain value 71'. In the fifth embodiment, the volume of the sidetone in the frequency bands different from the noise frequency band are increased by the first gain value 71'. Moreover, the volume of the sidetone in a frequency band the same as the noise frequency band is increased by the second gain value 72c. In the sixth embodiment, the volume of the sidetone in the frequency bands different from the noise frequency band are increased by the first gain value 71'. Moreover, the volume of the sidetone in a frequency band the same as the noise frequency band is decreased by the second gain value 72d. Last, the sound player 60 outputs the adjusted sidetone signal and the far-end sound. Thus, through the above manners of adjustment in the first embodiment to the sixth embodiment, the adjusted sidetone signal played by the sound player 60 can reduce disturbance of the user by noise.

Additionally, the communication device 10 can allow the user to use the near-end sound receiver 32 first to receive the near-end sound the user makes. Next, the sound processor 20 analyzes the characteristics of the near-end sound and sets the characteristics as a user parameter. When the processing module 20 adjusts the sidetone according to the results analyzed by the noise analyzer 42, the sidetone can be adjusted also according to the user parameter, such that the adjusted sidetone can emphasize and keep the user's original timbre. This makes sidetone compensation clearer and more obvious. Through the above process, the user can actually sense the volume of the near-end sound the user produces according to the volume of the adjusted sidetone.

It is noted that the output sidetone adjustment method of the present invention is not limited to the order of the steps mentioned above. As long as the object of the present invention is achieved, the order of the steps mentioned above can be varied.

As in the above description, the communication device 10 of the present invention can reduce disturbance of the user by ambient noise and provide the best sidetone compensation for the user when the user is communicating in a noisy environment. Thus, the user can actually sense the volume of the near-end sound the user produces.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. An output sidetone adjustment method comprising:
receiving a far-end sound wirelessly or over wires;
receiving a near-end sound to form a sidetone and obtaining an average input volume of the near-end sound;
detecting ambient noise of the near-end sound, in each of a plurality of distinct frequency bands;
analyzing an average noise volume and a noise frequency band of the ambient noise in each of the plurality of distinct frequency bands to determine whether the average noise volume of the ambient noise is higher than the average input volume;
in response to the average noise volume being higher than the average input volume, in a specific frequency band of the plurality of frequency bands, adjusting the volume of the sidetone in the specific frequency band by increasing it by a first gain value to form an adjusted sidetone, wherein the specific frequency band and the noise frequency band of the ambient noise belong to the same frequency band or different frequency bands;
outputting the adjusted sidetone and the far-end sound; and
simultaneously adjusting the volume which is not in the specific frequency band when the specific frequency band and the noise frequency band of the ambient noise belong to different frequency bands.

2. The output sidetone adjustment method as claimed in claim 1, wherein the step of obtaining the average input volume of the near-end sound comprises:
obtaining an average input volume in each frequency band of the near-end sound.

3. The output sidetone adjustment method as claimed in claim 1, wherein the step of determining whether the average noise volume of the ambient noise is higher than the average input volume comprises:
determining whether the average noise volumes in all frequency bands of the ambient noise are higher than the average input volumes in all frequency bands of the near-end sound.

4. The output sidetone adjustment method as claimed in claim 1, wherein the step of determining whether the average noise volume of the ambient noise is higher than the average input volume comprises:

determining whether the average noise volume in the noise frequency band of the ambient noise is higher than the average input volume in a corresponding frequency band of the near-end sound.

5. The output sidetone adjustment method as claimed in claim 1 further comprising the following step:
simultaneously adjusting the volume which is not in the specific frequency band when the specific frequency band and the noise frequency band of the ambient noise belong to the same frequency band.

6. The output sidetone adjustment method as claimed in claim 5 further comprising the following step:
if the average noise volume of the ambient noise is higher than the average input volume, and the volume difference exceeds a threshold, further increasing volume which is not in the specific frequency band by a second gain value, wherein the second gain value is smaller than the first gain value.

7. The output sidetone adjustment method as claimed in claim 5 further comprising the following step:
if the average noise volume of the ambient noise is higher than the average input volume, but the volume difference does not exceed a threshold, further decreasing volume which is not in the specific frequency band by a second gain value, wherein the second gain value is smaller than the first gain value.

8. The output sidetone adjustment method as claimed in claim 1 further comprising the following step:
if the average noise volume of the ambient noise is higher than the average input volume, and the volume difference exceeds a threshold, further increasing volume which is not in the specific frequency band by a second gain value, wherein the second gain value is smaller than the first gain value.

9. The output sidetone adjustment method as claimed in claim 1 further comprising the following step:
if the average noise volume of the ambient noise is higher than the average input volume, but the volume difference does not exceed a threshold, further decreasing volume which is not in the specific frequency band by a second gain value, wherein the second gain value is smaller than the first gain value.

10. The output sidetone adjustment method as claimed in claim 1 further comprising the following step:
simultaneously adjusting the volume of the sidetone in the specific frequency band according to a user parameter to form the adjusted sidetone.

11. The output sidetone adjustment method as claimed in claim 10 further comprising the following step:
analyzing the near-end sound to obtain the user parameter after s the near-end sound is received.

12. A communication device comprising:
a sound processor;
a far-end sound receiver electrically connected to the sound processor and used for receiving a far-end sound wirelessly or over wires;
a near-end sound receiver electrically connected to the sound processor and used for receiving a near-end sound to allow the sound processor to receive the near-end sound to form a sidetone and to obtain an average input volume of the near-end sound;
a noise detector electrically connected to the sound processor and used for detecting ambient noise of the near-end sound, in each of a plurality of distinct frequency bands;
a noise analyzer electrically connected to the noise detector and used for analyzing an average noise volume and a noise frequency band of the ambient noise in each of the plurality of distinct frequency bands to determine whether the average noise volume of the ambient noise is higher than the average input volume, wherein in response to the average noise volume being higher than the average input volume, in a specific frequency band of the plurality of frequency bands, the sound processor adjusts the volume of the sidetone in the specific frequency band by increasing it by a first gain value to form an adjusted sidetone, wherein the specific frequency band and the noise frequency band of the ambient noise belong to the same frequency band or different frequency bands; and
a sound player electrically connected to the sound processor and used for outputting the adjusted sidetone and the far-end sound,
wherein when the specific frequency band and the noise frequency band of the ambient noise belong to the same frequency band, the sound processor simultaneously adjusts the volume which is not in the specific frequency band.

13. The communication device as claimed in claim 12, wherein the sound processor further obtains an average input volume in each frequency band of the near-end sound.

14. The communication device as claimed in claim 12, wherein the noise analyzer further determines whether the average noise volume in all frequency bands of the ambient noise are higher than the average input volume in all frequency bands of the near-end sound.

15. The communication device as claimed in claim 12, wherein the noise analyzer further determines whether the average noise volume in the noise frequency band of the ambient noise is higher than the average input volume in a corresponding frequency band of the near-end sound.

16. The communication device as claimed in claim 12, wherein if the average noise volume of the ambient noise is higher than the average input volume, and the volume difference exceeds a threshold, the sound processor further increases volume which is not in the specific frequency band by a second gain value, wherein the second gain value is smaller than the first gain value.

17. The communication device as claimed in claim 12, wherein if the average noise volume of the ambient noise is higher than the average input volume, but the volume difference does not exceed a threshold, the sound processor further decreases volume which is not in the specific frequency band by a second gain value, wherein the second gain value is smaller than the first gain value.

18. The communication device as claimed in claim 12, wherein when the specific frequency band and the noise frequency band of the ambient noise belong to different frequency bands, the sound processor simultaneously adjusts the volume which is not in the specific frequency band.

19. The communication device as claimed in claim 18, wherein if the average noise volume of the ambient noise is higher than the average input volume, and the volume difference exceeds a threshold, the sound processor further increases volume which is not in the specific frequency band by a second gain value, wherein the second gain value is smaller than the first gain value.

20. The communication device as claimed in claim 18, wherein if the average noise volume of the ambient noise is higher than the average input volume, but the volume difference does not exceed a threshold, the sound processor further decreases volume which is not in the specific frequency band by a second gain value, wherein the second gain value is smaller than the first gain value.

21. The communication device as claimed in claim 12 further comprising a storage module used for storing a user parameter, wherein the sound processor simultaneously adjusts the volume of the sidetone in the specific frequency band according to the user parameter to form the adjusted sidetone.

22. The communication device as claimed in claim 21, wherein the near-end sound receiver allows the sound processor to analyze the near-end sound to obtain the user parameter after the near-end sound receiver receives the near-end sound.

\* \* \* \* \*